United States Patent
Hashimoto et al.

(10) Patent No.: US 9,086,044 B2
(45) Date of Patent: Jul. 21, 2015

(54) START CONTROL APPARATUS FOR ENGINE GENERATOR

(75) Inventors: Shoji Hashimoto, Wako (JP); Ryuichi Kimata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 692 days.

(21) Appl. No.: 13/472,566

(22) Filed: May 16, 2012

(65) Prior Publication Data

US 2012/0291739 A1 Nov. 22, 2012

(30) Foreign Application Priority Data

May 17, 2011 (JP) ................................. 2011-110575

(51) Int. Cl.
*F02N 11/08* (2006.01)
*H02P 27/04* (2006.01)
*H02P 27/08* (2006.01)
*F02N 11/04* (2006.01)
*F02N 19/00* (2010.01)
*H02P 29/00* (2006.01)
*F02D 29/06* (2006.01)

(52) U.S. Cl.
CPC .............. *F02N 11/08* (2013.01); *H02P 27/042* (2013.01); *H02P 27/08* (2013.01); *F02D 29/06* (2013.01); *F02N 11/04* (2013.01); *F02N 19/005* (2013.01); *F02N 2300/104* (2013.01); *H02P 29/0038* (2013.01); *H02P 2209/05* (2013.01); *H02P 2209/11* (2013.01)

(58) Field of Classification Search
CPC ....... F02N 11/08; F02N 11/04; F02N 19/005; F02N 2300/104; H02P 27/042; H02P 27/08; H02P 2209/05; H02P 2209/11; F02D 29/06
See application file for complete search history.

(56) References Cited

U.S. PATENT DOCUMENTS

| 6,177,734 | B1 * | 1/2001 | Masberg et al. | 290/31 |
| 6,253,127 | B1 * | 6/2001 | Itoyama et al. | 701/22 |
| 7,996,145 | B2 * | 8/2011 | Snyder | 701/104 |
| 8,280,570 | B2 * | 10/2012 | Masuda | 701/22 |
| 8,497,591 | B2 * | 7/2013 | Daum et al. | 290/31 |
| 8,594,913 | B2 * | 11/2013 | Steuernagel | 701/113 |

(Continued)

FOREIGN PATENT DOCUMENTS

| JP | 2004-218467 | 8/2004 |
| JP | 2009-214816 | 9/2009 |
| JP | 2010-031660 | 2/2010 |

(Continued)

OTHER PUBLICATIONS

Japanese Office Action dated Apr. 23, 2014, Application No. 2011-110575; English Translation Included.

*Primary Examiner* — Hieu T Vo
*Assistant Examiner* — Sherman Manley
(74) *Attorney, Agent, or Firm* — Rankin, Hill & Clark LLP

(57) ABSTRACT

In a start control apparatus for an engine generator having a booster adapted to boost an output of a battery, there is provided an engine starter adapted to supply the boosted battery output to an output winding as a motor current to start the engine, and it is configured to determine whether a position of the piston is before a top dead center (TDC) when the motor current is to be supplied to the winding, and the motor current is increased by an increment when the piston position of the engine is determined to be before the TDC.

9 Claims, 9 Drawing Sheets

(56) References Cited

U.S. PATENT DOCUMENTS

2004/0153235 A1* 8/2004 Kataoka et al. ............... 701/112
2013/0233268 A1* 9/2013 Yamaguchi et al. ....... 123/179.3

FOREIGN PATENT DOCUMENTS

| JP | 2010-035262 | 2/2010 |
| JP | 2010-206904 | 9/2010 |

* cited by examiner

FIG.12A

| NE(rpm) | 0 | 100 | 200 | 300 | 400 | 500 | 600 | 700 |
|---|---|---|---|---|---|---|---|---|
| DUTY(%) | 30 | 40 | 45 | 50 | 50 | 50 | 60 | 70 |

FIG.12B

| CRANK ANGLE | 90 | 180 |
|---|---|---|
| DUTY(%) | 5 | 15 |

START CONTROL APPARATUS FOR ENGINE GENERATOR

BACKGROUND OF THE INVENTION

1. Technical Field

An embodiment of the invention relates to a start control apparatus for an engine generator.

2. Background Art

It is a known technique for an engine generator, such as an inverter generator to generate power based on outputs from windings wound around an alternator which is driven by an engine, as taught, for example, by Japanese Laid-Open Patent Application No. 2004-218467. In the reference, the engine generator is equipped with a starter motor and operates the starter motor to start the engine.

SUMMARY

In the technique of the reference, since the engine generator needs to be equipped with the starter motor, the structure becomes complex disadvantageously. Therefore, it will be considered to supply power to the windings for power generation to use it as a motor for starting the engine. However, when the piston of the engine is at a position before a compression top dead center (TDC), since it requires relatively a large torque to pass through the TDC, it may be difficult to start the engine.

An object of an embodiment of this invention is therefore to overcome the foregoing problems by providing a start control apparatus for an engine generator that can supply power to a winding for power generation to use it as a motor for starting the engine, thereby enabling to start the engine reliably even when a piston of the engine is at a position before the compression TDC.

In order to achieve the object, the embodiment provides in its first aspect a start control apparatus for an engine generator adapted to generate power based on an output from a winding wound around an alternator driven by an engine, comprising a battery, a booster to boost an output of the battery, an engine starter adapted to supply the boosted battery output to the winding as a motor current to start the engine, a piston position determiner adapted to determine whether a position of a piston of the engine is before a top dead center when the boosted output is supplied to the winding, and a motor current determiner adapted to increase the motor current by an increment when the piston is determined to be at a position before the top dead center.

In order to achieve the object, the embodiment provide in its second aspect a method for a start control apparatus for an engine generator adapted to generate power based on output from a winding wound around an alternator driven by an engine, having a battery, the improvement comprises the steps of boosting output of the battery, starting the engine by supplying the boosted battery output to the winding as a motor current, determining whether a position of the piston is before a top dead center when the boosted output is supplied to the winding, and increasing the motor current by an increment when the position of the piston is determined to be at a position before the top dead center.

BRIEF DESCRIPTION OF DRAWINGS

The above and other objects and advantages will be more apparent from the following description and drawings in which:

FIGS. 12A-12B are explanatory views showing a current value (duty factor) used for a control of an engine start operation

DESCRIPTION OF EMBODIMENT

A start control apparatus for an engine generator according to an embodiment of the present invention will now be explained with reference to the attached drawings.

Figure 1:
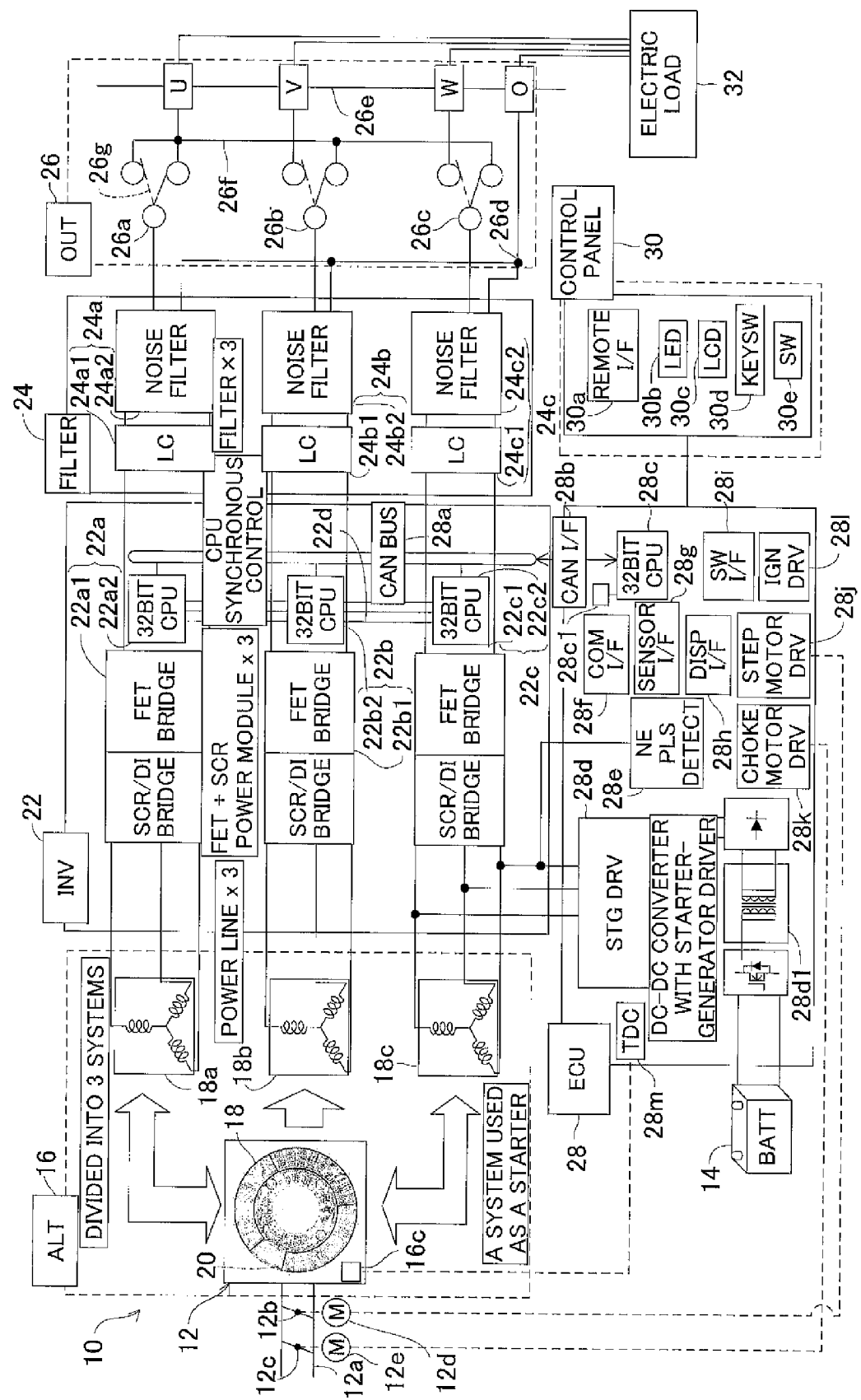
FIG. 1 is an overall block diagram showing a start control apparatus for an engine generator (inverter generator) according to an embodiment of the invention.

FIG. 1 is an overall block diagram showing a start control apparatus for an engine generator (inverter generator) according to an embodiment of the invention.

In FIG. 1, a symbol 10 designates an engine generator. Since the engine generator is configured as an inverter generator, the engine generator 10 is hereinafter called as an inverter generator.

The inverter generator 10 is equipped with an engine (internal combustion engine) 12 and has a rated output of about 5 kW (AC (alternating current) 100V, 50 A). The engine 12 is an air-cooled, spark-ignition gasoline engine with four cycles of intake, compression, combustion, and exhaust.

A throttle valve 12b and choke valve 12c are installed in an air intake pipe 12a of the engine 12. The throttle valve 12b is connected to a throttle motor (composed of a stepper motor) 12d, and the choke valve 12c is connected to a choke motor (also composed of a stepper motor) 12e.

The engine 12 is equipped with a battery 14 whose rated output is about 12V. When power is supplied from the battery 14, the throttle motor 12d and choke motor 12e respectively drive the throttle valve 12b and choke valve 12c to open and close. The engine 12 has an alternator section (shown as "ALT") 16.

Figure 2:
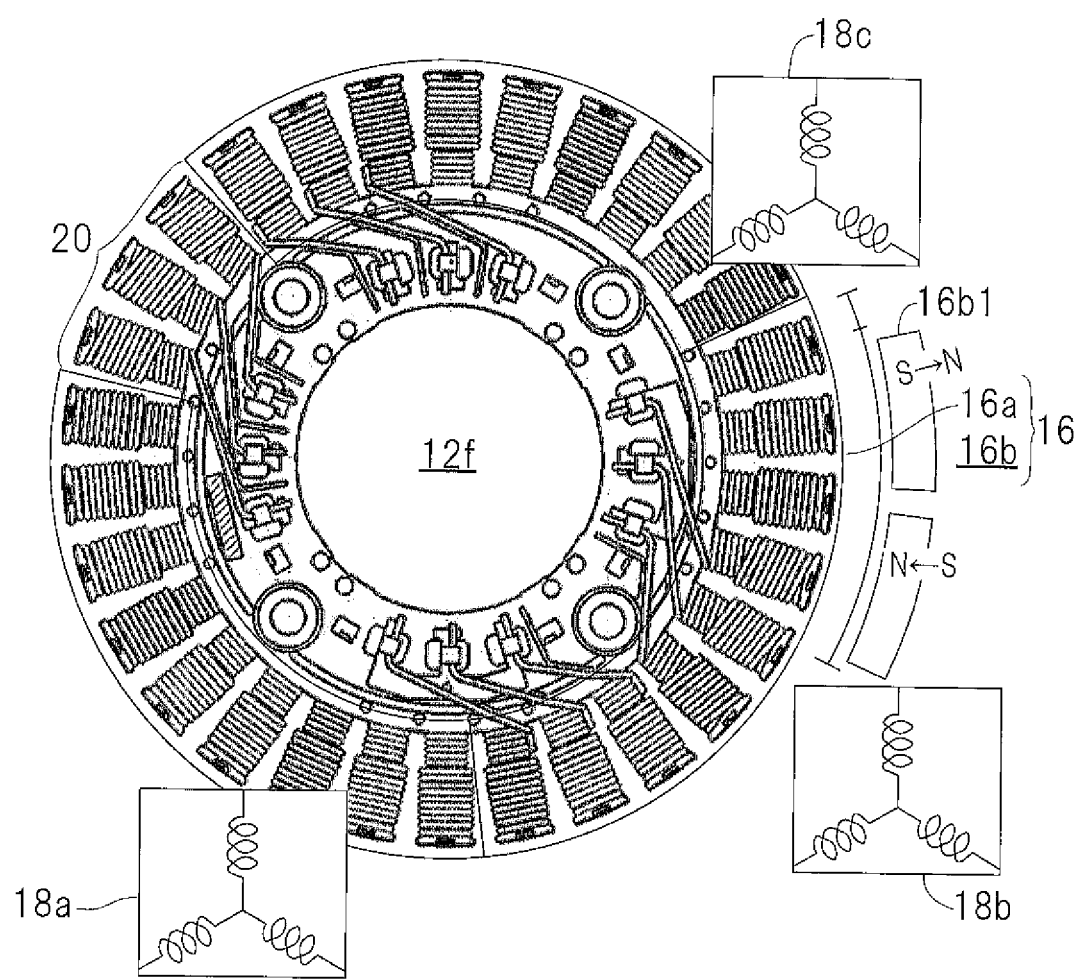
FIG. 2 is a plan view showing a crank case of an engine of the engine generator shown in FIG. 1.

FIG. 2 is a plan view of a crank case 12f of the engine 12 shown in FIG. 1, where the alternator section 16 is provided.

As shown in FIG. 2, the alternator section 16 includes a stator 16a mounted on the crank case 12f of the engine 12, and a rotor 16b which is rotatably installed around the stator 16a and also functions as a flywheel of the engine 12.

The stator 16a comprises thirty teeth. Twenty-seven teeth of them are wound by three-phase output windings (main windings) 18 comprising of three sets of U, V and W-phase windings, and the other three teeth of them are also wound by one three-phase output winding (sub winding) 20 comprising one set of the U, V, and W-phase windings. The main windings 18 comprise windings 18a, 18b and 18c.

Multiple pairs of permanent magnet pieces 16b1 are embedded or attached inside the rotor 16b installed on the outer side of the stator 16a with radially oriented polarity reversed alternately to face the output windings 18, 20. In the alternator section 16, when the permanent magnet pieces 16b1 of the rotor 16b are rotated around the stator 16a, AC power of the U, V, and W-phase is outputted (generated) from the three-phase output windings 18 (more specifically, 18a, 18b, 18c) and the AC power of each phase is also outputted from the sub winding 20.

The explanation of FIG. 1 will be resumed. The start control apparatus for the generator 10 according to this embodiment has the alternator section (ALT) 16 where the output windings 18 are wound, an inverter section (shown as "INV") 22, a filter section (shown as "FILTER") 24, an output section (shown as "OUT") 26, an engine control section (shown as "ECU") 28, and an engine control panel section (shown as "CONTROL PANEL") 30. The ECU (Electronic Control Unit) functions as an electronic control section and has a CPU as explained later. As shown, the generator 10 is configured as the engine generator that generates power based on outputs from the winding (output winding) 18 wound on the alternator section 16 which is driven by the engine 12.

As illustrated, the characteristic feature of the generator 10 according to this embodiment is that three sets (three) of single-phase inverter generators (inverters) are connected in parallel so that they can output a three-phase AC of a desired voltage in a desired phase or a single-phase AC of a desired voltage selectively and reliably.

Specifically, the generator 10 has three sets of windings 18 composed of first, second and third windings 18a, 18b, 18c, the inverter section 22 comprising three sets of the inverters composed of first, second and third inverters (inverter generators) 22a, 22b, 22c, the filter section 24 comprising three sets of filters composed of first, second and third filters 24a, 24b, 24c, the output section 26 comprising a three-phase output terminal 26e and a single-phase output terminal 26f, the engine control section 28 that controls an operation of the engine 12, and the control panel section 30.

The inverter section 22 and other sections are provided with, for example, semiconductor chips installed on a printed circuit board accommodated in a case located at an appropriate position of the engine 12. The control panel section 30 is also provided with semiconductor chips similarly installed at an appropriate position of the engine 12 and a panel connected thereto.

The output windings 18, the inverter section 22, the filter section 24 and the output section 26 (each comprising three sets labeled with letters a, b or c) are configured to be connected with the part of the same letter to each other correspondently.

The first, second and third inverters 22a, 22b, 22c constituting the inverter section 22 comprise single-phase two-wire inverters that have power modules 22a1, 22b1, 22c1 composed of FETs (Field Effect Transistors) and SCRs (thyristors) integrally connected thereto, 32-bit CPUs 22a2 (first controller), 22b2 (second controller), 22c2 (third controller), and interphase voltage/current sensors 22a3, 22b3, 22c3 for detecting voltage and current between phases of a power output. The CPUs 22a2, 22b2, 22c2 are connected via a communication path 22d with each other to be able to communicate therewith.

The first, second and third inverters 22a, 22b, 22c constituting the inverter section 22 comprise single-phase two-wire inverters that have power modules 22a1, 22b1, 22c1 composed of FETs (Field Effect Transistors) and SCRs (thyristors) integrally connected thereto, 32-bit CPUs 22a2 (first controller), 22b2 (second controller), 22c2 (third controller), and voltage and current sensors (not shown) for detecting voltage and current of a power output. The CPUs 22a2, 22b2, 22c2 are connected via a communication path 22d with each other to be able to communicate therewith.

Figure 3:
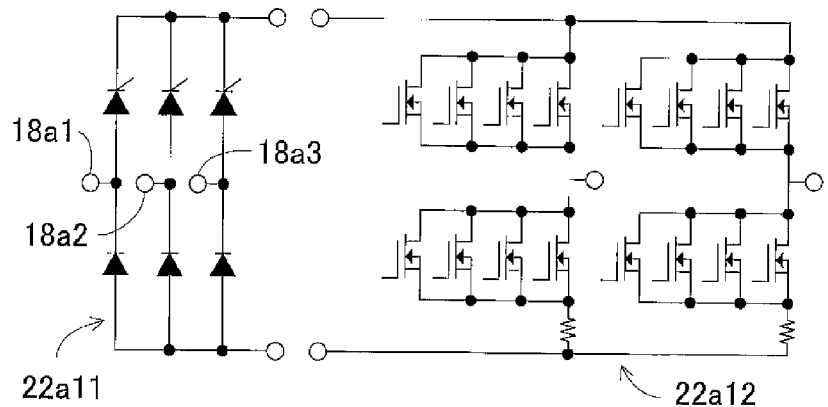
FIG. 3 is a circuit diagram showing a detailed configuration of an inverter section of the engine generator shown in FIG. 1.

FIG. 3 is a circuit diagram showing a configuration of the inverter section 22 in detail. Although the following explanation will be made for the set a, the explanation can also be applied to the sets b and c, since their configurations are basically the same with each other.

As illustrated in FIG. 3, the power module 22a1 comprises a hybrid bridge circuit 22a11 in which three SCRs (thyristors used as switching elements for direct current (DC) conversion) and three DIs (diodes) are bridge-connected, and an H bridge circuit 22a12 in which four FETs (Field Effect Transistors used as switching elements for AC conversion) are bridge-connected.

Three-phase AC power outputted (generated) from the U-phase winding 18a of the output windings 18 wound around the alternator section 16 is inputted to the first inverter 22a associated therewith and then inputted to a mid-point between the SCR and DI in the hybrid bridge circuit 22a11 of the power module 22a1.

A gate of the SCR in the hybrid bridge circuit 22a11 is connected to the battery 14 via a driver circuit (not shown). The CPU 22a2 controls current supply (ON; conducted) or termination of the current supply (OFF; not conducted) to the gate of the SCR from the battery 14 through the driver circuit.

Specifically, based on the output of sensors, such as the voltage/current sensor 22a3, the CPU 22a2 turns ON (conducts) the gate of the SCR at a turn-on angle (angle of conduction) corresponding to a desired output voltage, such that the AC inputted to the power module 22a1 from the output winding 18a is converted into DC at the desired output voltage.

The DC outputted from the hybrid bridge circuit 22a11 is inputted to the FETs-H bridged circuit 22a12 where the FETs are connected to the battery 14. The CPU 22a2 controls current supply (ON; conducted) to the FETs or termination of current supply (OFF; not conducted), the inputted DC is inverted into AC in a desired frequency (e.g., a commercial frequency of 50 Hz or 60 Hz).

Figure 4:
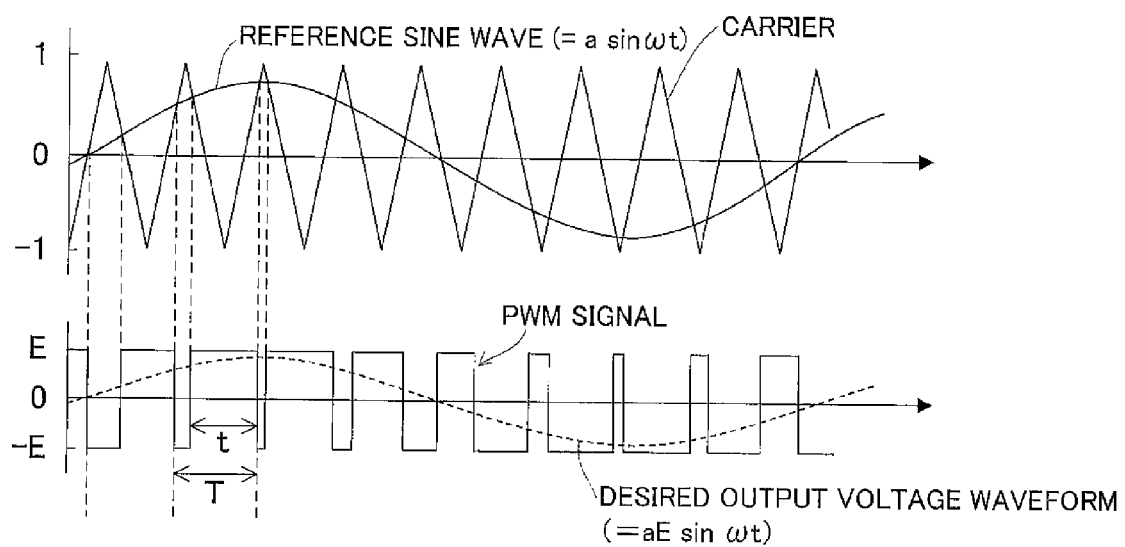
FIG. 4 is an explanatory view explaining an operation of the inverter section of the engine generator shown in FIG. 1.

FIG. 4 is an explanatory view explaining an operation of the H bridge circuit 22a12.

As illustrated, the CPU 22a2 generates a reference sine wave (signal wave; shown by an upper solid-line wave) in a predetermined frequency (i.e., 50 Hz or 60 Hz commercial frequency) of the desired output voltage (in waveform), and compares the generated reference sine wave with a carrier (e.g., a 20 kHz carrier wave) using a comparator (not shown) so as to produce a PWM (Pulse Width Modulation) signal, and turns ON/OFF the FETs in the H bridge circuit 22a12 in accordance with the produced PWM signal.

The lower broken-line wave shown in the FIG. 4 indicates the desired output voltage (in waveform). It should be noted that the period T (step) of the PWM signal (PWM waveform) is actually much shorter than shown, but is enlarged in FIG. 4 for ease of understanding.

Again returning to the explanation of FIG. 1, the inverter section 22 is connected to the filter section 24.

The filter section 24 comprises LC filters (low pass filters) 24a1, 24b1, 24c1 that remove a higher harmonic wave and noise filters 24a2, 24b2, 24c2 that remove a noise. The AC output inverted in the inverter section 24 is inputted to the LC filters 24a1, 24b1, 24c1 and noise filters 24a2, 24b2, 24c2 to remove a higher harmonic wave and noise.

Figure 5:
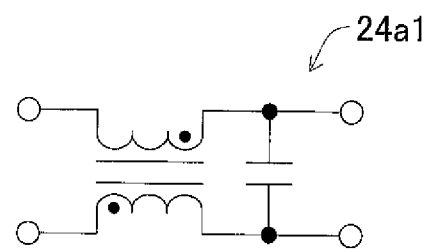
FIG. 5 is a circuit diagram showing a detailed configuration of a filter section of the engine generator shown in FIG. 1.
Figure 6:
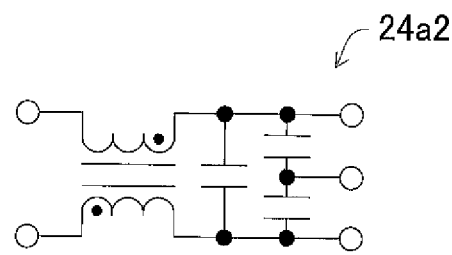
FIG. 6 is a circuit diagram similar to FIG. 5, but showing another detailed configuration of the filter section of the engine generator shown in FIG. 1.

FIG. 5 shows a circuit configuration of the LC filter 24a1, and FIG. 6 shows a circuit configuration of the noise filter 24a2. Although not shown, circuit configurations of the LC filters 24b1, 24c1 and noise filters 24b2, 24c2 are the same.

In FIG. 1, the inverter section 22 is connected to the output section 26 via the filter section 24.

As shown in the figure, the output section 26 comprises a three-phase (four-wire) output terminal 26e and a single-phase (two-wire) output terminal 26f. The three-phase output terminal 26e is connected to terminal groups 26a, 26b, 26c which are in turn connected to the first, second and third inverters 22a, 22b, 22c respectively and output one AC in a phase from among U, V, W-phases respectively, and is connected to a neutral terminal (neutral point) 26d of the terminal groups in series. The single-phase output terminal 26f is connected to the terminal groups in parallel and to the neutral terminal 26d in series.

To be more specific, the three-phase (four-wire) output terminal 26e is series-connected to a U-phase terminal 26a which is connected to the first inverter 22a and outputs a U-phase AC, to a V-phase terminal 26b which is connected to the second inverter 22b and outputs a V-phase AC, to a W-phase terminal 26c which is connected to the third inverter 22c and outputs a W-phase AC, and to the neutral O-phase terminal 26d respectively.

Further, the output section 26 has the single-phase (two-wire) output terminal 26f which is parallel-connected to the U-phase terminal 26a, to the V-phase terminal 26b and to the W-phase terminal 26c, and is series-connected to the O-phase terminal 26d, and has a switching mechanism 26g that switches the three-phase output terminal 26e and the single-phase output terminal 26f.

The three-phase output terminal 26e and single-phase output terminal 26f are connected to an electric load 32 via a connector (not shown) and the like.

The engine control section 28 has a 32-bit CPU 28c and controls operation of the engine 12. The engine control section 28 is connected to the CPUs 22a2, 22b2, 22c2 (first, second and third controllers) of the inverters 22a, 22b, 22c via a CAN (Control Area Network) BUS 28a and a CAN I/F (Interface) 28b so that it can communicate with the CPUs 22a2, 22b2, 22c2. The output from the aforementioned output winding (sub winding) 20 is supplied to the CPU 22a2, 22b2, 22c2, 28c as their operating power.

The engine control section 28 has a starter-generator driver (STG DRV) 28d which operates the output winding 18c, in addition to the generator, as a starting device (starter) of the engine 12. Specifically, in this embodiment, one of the output windings 18a, 18b, 18c (e.g., output winding 18c) is configured to operate as an engine starter with the aid of the starter-generator driver 28d, in other words the alternator section 16 is configured to operate as a prime mover.

The starter-generator driver 28d comprises a DC-DC converter 28d1. As describer later, the DC-DC converter 28d1 boosts the output (raises its voltage) of the battery 14 to about 200V and supplies the boosted battery output to the output winding 18c through the starter-generator driver (STG DRV) 28d in response to a command from the CPU 28c to rotate the rotor 16b of the alternator section 16 relative to the stator 16a so as to start the engine 12.

The engine control section 28 further includes an engine speed detection circuit 28e which is connected to the U-phase terminal of the output winding 18c and detects the engine speed based on the output thereof, a communication (COM) I/F 28f, a sensor (Sensor) I/F 28g, a display (DISP) I/F 28h, a switching (SW) I/F 28i, a drive circuit 28j for driving the stepper motor 12d, a drive circuit 28k for driving the choke motor 12e, and an ignition drive circuit 28l for driving an ignition device (not shown).

The engine control section 28 further includes a TDC (Top Dead Center) detection circuit 28m.

Specifically, the alternator section 16 is installed with a pulsar 16c and a disc (providing a plurality of projections arranged circumferentially at intervals) attached to the rotor 16b and a magnetic pickup installed at the stator 16a. When a piston of the engine 12 is at a position of the TDC (top dead center), the pulsar 16c outputs two successive pulse signals (e.g., one pulse signal at the TDC and one at ATDC (after top dead center) 10 degrees), while when the piston of the engine 12 is at a position of any of ATDC 90 degrees, a BDC (bottom dead center), and BTDC (before top dead center) 90 degrees, the pulsar 16c outputs one pulse signal.

The TDC detection circuit 28m detects a piston position including the TDC of the engine 12 by inputting the pulse signal from the pulsar 16c. Further, the CPU 28c has a non-volatile memory (EEPROM (registered trademark)) 28c1 that keeps stored data even after the engine 12 is stopped.

The aforementioned 32-bit CPU 28c determines an opening of the throttle valve 12b in such a manner that the engine speed converges at a desired engine speed calculated in accordance with a required AC output to be supplied to the electric load 32, and supplies current (power) to the throttle motor 12d through the drive circuit 28j to control its operation.

The control panel section 30 has a remote (REMOTE) I/F 30a which is connected wirelessly (or in wired) to a remote control box (not shown) provided separately from the engine 12 and adapted to be carried by a user, an LED (Light Emitting Diode) 30b, an LCD (Liquid Crystal Display) 30c, a KEY switch (main switch) 30d which is adapted to be manipulated by the user and to send a command to operate (start) and stop the generator 10, and a three-phase/single-phase selector switch 30e which is adapted to send a command to switch the output from the generator 10 between the three-phase AC and single-phase AC.

The control panel section 30 and the engine control section 28 are connected wirelessly (or in wired) to communicate with each other. The outputs of the KEY switch 30d and selector switch 30e of the control panel section 30 are inputted to the engine control section 28 through the switching I/F 28i, and the engine control section 28 controls to flush the LED 30b and LCD 30c of the control panel section 30 through the display I/F 28h.

Figure 7:
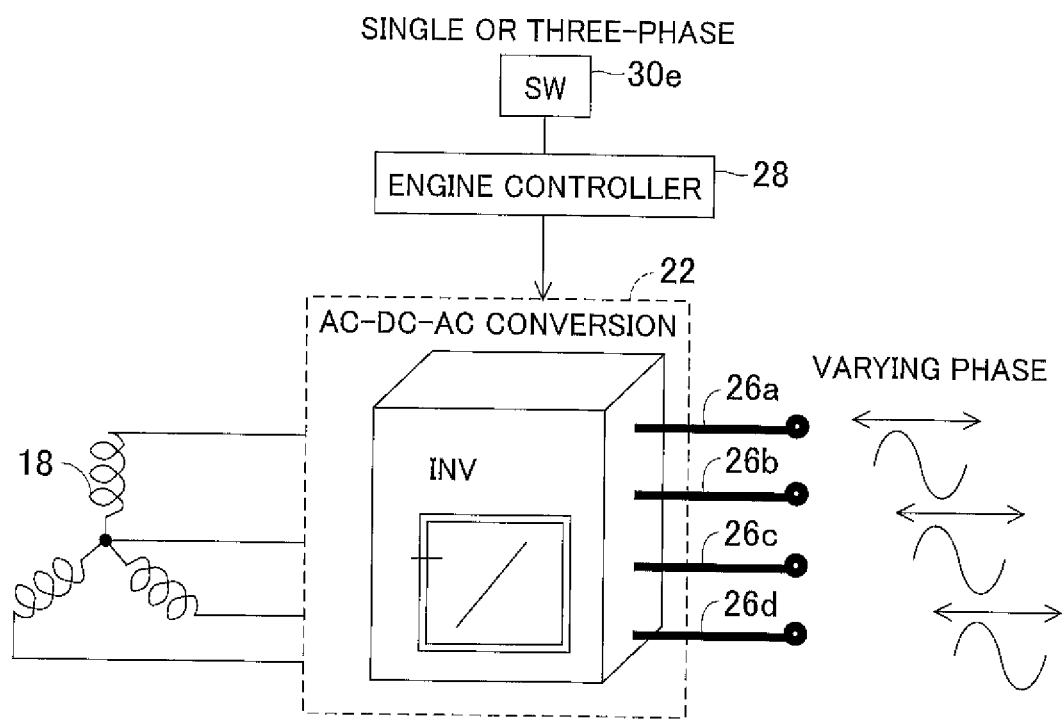
FIG. 7 is an explanatory view showing an operation of an engine control section of the engine generator shown in FIG. 1.

FIG. 7 is an explanatory view showing an operation of the engine control section 28.

As described above, since the generator 10 of this embodiment is intended to selectively and reliably output the three-phase AC and single-phase AC at a desired voltage, the inverter section 22 is configured to have three sets of the single-phase inverters (first, second and third inverters) 22a, 22b, 22c, and the CPU 28c of the engine control section 28 is configured to operate the switching mechanism 26g of the output section 26 to switch the three-phase output terminal and the single-phase output terminal and to output three-phase or single-phase output by communicating with the CPUs 22a, 22b, 22c in response to the output of the selector switch 30e.

In the inverter section 22 of this embodiment, one of the single-phase inverters 22a, 22b, 22c, e.g., the inverter 22a is designated as a master inverter and the others as slave inverters. When the three-phase AC is outputted from the generator 10, as shown in FIG. 7, the CPUs 22a2, 22b2, 22c2 of the three sets of the single-phase inverters 22a, 22b, 22 control the operation of the inverter section 22, making the output phase from the U-phase output terminal 26a of the master inverter 22a as a reference, such that the output phases from the V-phase output terminal 26b and W-phase output terminal 26c of the slave inverters 22b, 22c are offset or delayed from that from the U-phase output terminal 26a by 120 degrees.

On the other hand, when the single-phase AC is outputted along with the communication with the CPU 28c, the CPUs 22a2, 22b2, 22c2 control the operation of the inverter section 22 to synchronize the outputs from the V-phase output terminal 26b and W-phase output terminal 26c of the slave inverters 22b, 22c in phase, making the output from the U-phase terminal 26a of the master inverter 22a as the reference, such that the single-phase AC is outputted from the single-phase output terminal 26f.

Figure 8:
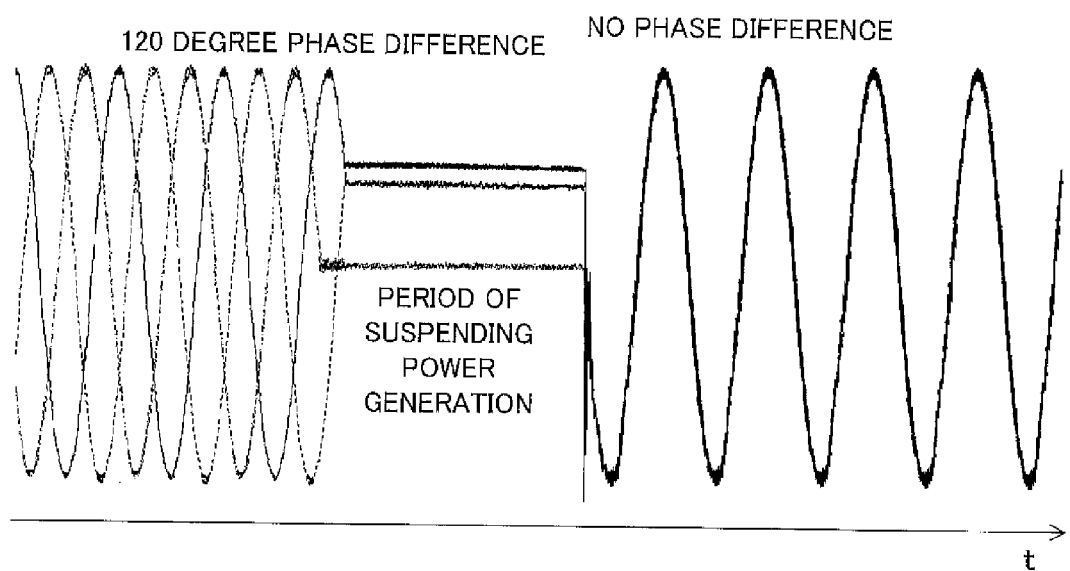
FIG. 8 is a time chart showing waveforms when an output is switched from a three-phase output to a single-phase output in response to the operation shown in FIG. 7.
Figure 9:
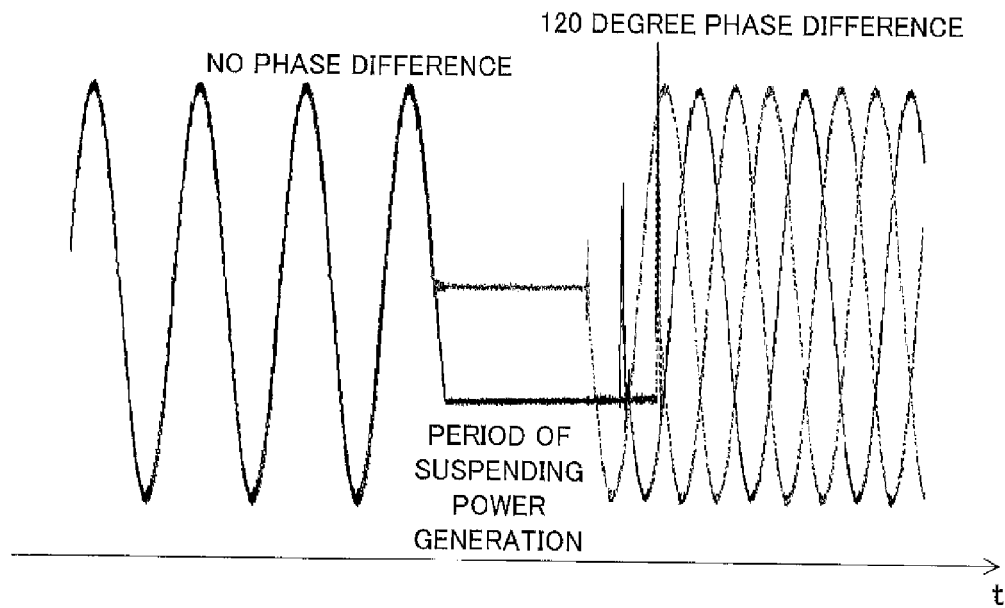
FIG. 9 is a time chart showing waveforms when an output is switched from a single-phase output to a three-phase output in response to the operation shown in FIG. 7.

FIG. 8 is a time chart showing waveforms in a case where the output is switched from the three-phase output to the single-phase output, and FIG. 9 is a time chart showing waveforms in the opposite case. As shown, the three-phase output and single-phase output of the desired voltage are selectively outputted from the generator 10 in response to the manipulation of the selector switch 30e of the control panel section 30 by the user.

Figure 10:
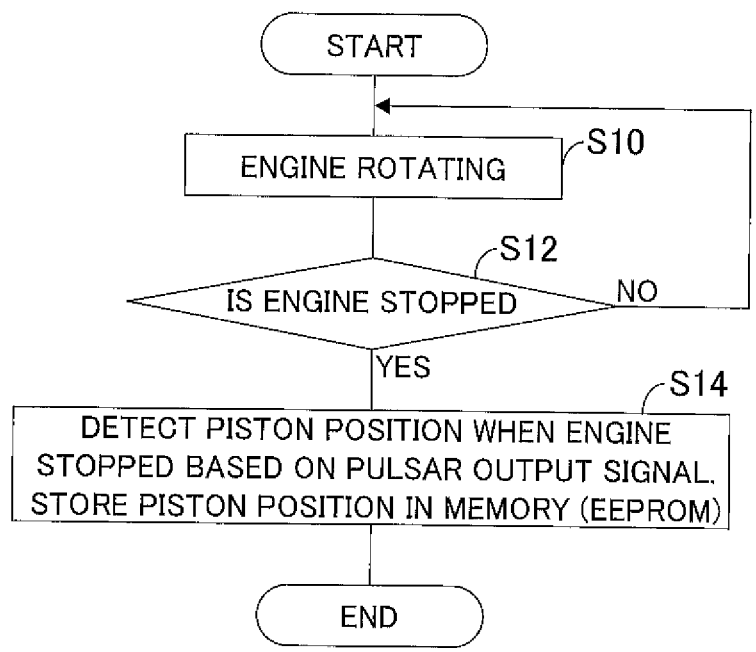
FIG. 10 is a flowchart showing a control of the engine control section when the engine is started and stopped, precisely, when the engine is stopped.
Figure 11:
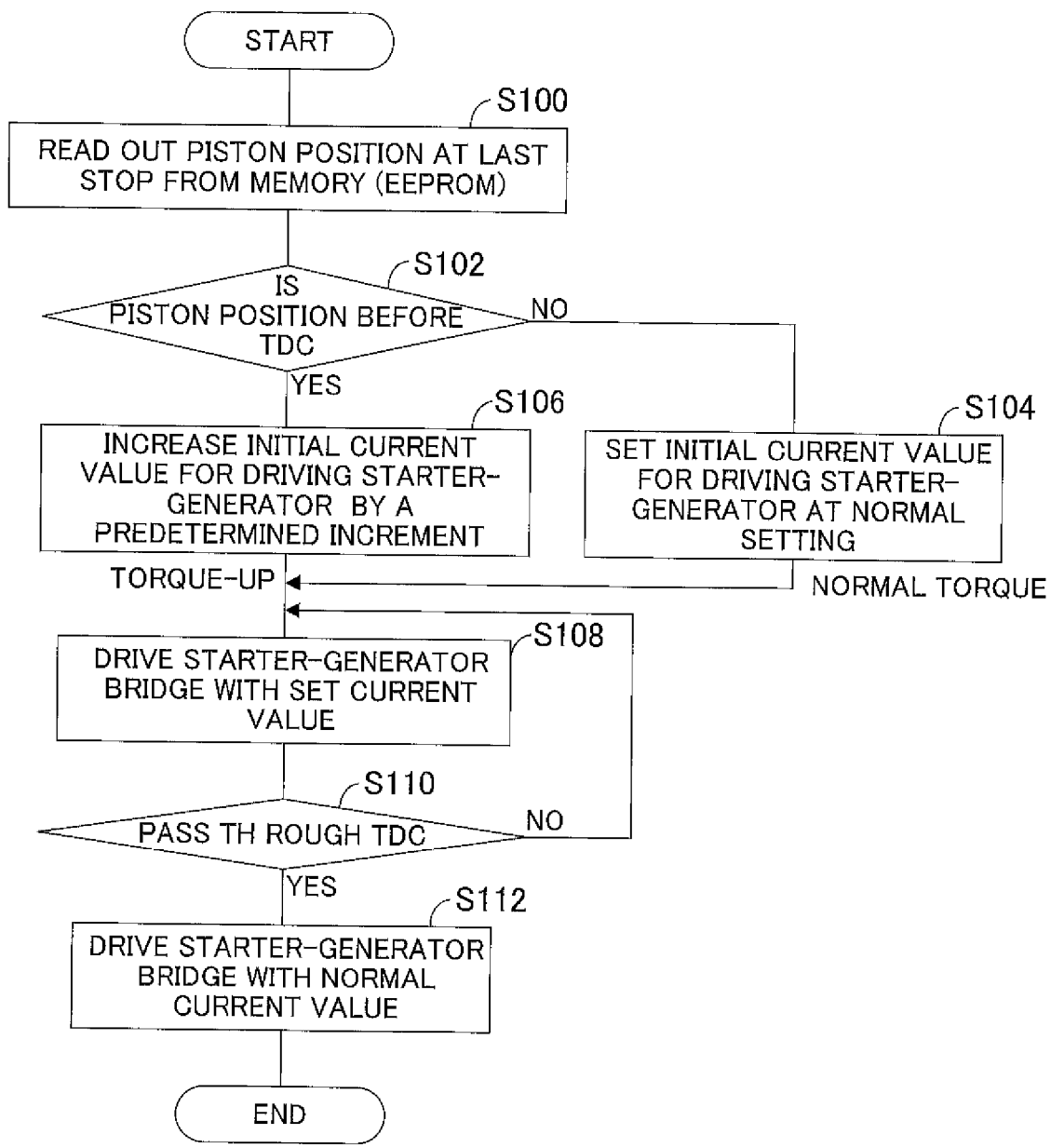
FIG. 11 is a flowchart showing a control of the engine control section when the engine is started and stopped, precisely, when the engine is started.

FIGS. 10, 11 are flowcharts showing controls of the engine control section 28 when the engine is started and stopped, precisely, FIG. 10 shows a control when the engine is stopped, while FIG. 11 when the engine is started.

In addition to the features explained with reference to FIGS. 7 to 9, the CPU 28c of the engine control section 28 according to this embodiment is configured to be a start control device for controlling the starting operation of the engine 12 via the starter-generator driver 28d.

FIG. 10 shows the processing of the CPU 28c of the engine control section 28 executed until the engine 12 is stopped once started.

The program begins at S10, in which the TDC is continuously detected in accordance with the output signal (pulse signal) from the pulsar 16c so for as the engine is operated, and the program proceeds to S12, in which it is determined whether the engine is stopped. When the result in S12 is negative, the program returns to S10.

When the result in S12 is affirmative, the program proceeds to S14, in which the piston position at the time when the engine 12 was stopped is detected or estimated in accordance with the output signal from the pulsar 16c, and the detected piston position is stored into the nonvolatile memory 28c1.

Specifically, as described above, since the pulsar 16c outputs one pulse signal at every 90 degree of the crank angle and two successive pulse signals at the TDC position and therearound, it enables to detect or estimate the piston position at the time the engine 12 was stopped, for example, the piston position can be detected or estimated as a position between the BTDC 90 degree and TDC or between the ATDC 90 degree and BDC, or the like. In S14, the piston position detected as explained above is stored into the nonvolatile memory 28c1.

The program shown in FIG. 11 is executed when power from the battery 14 is supplied to the CPU 28c of the engine control section 28 in response to an ON signal of the KEY switch 30d manipulated by the user.

As described above, in this embodiment, the CPU 28c boosts the output of the battery 14 to about 200V by driving the DC-DC converter 28d1 and supplies the boosted battery output to the output winding 18c through the starter-generator driver 28d to rotate the rotor 16b of the alternator section 16 relative to the stator 16a so as to start the engine 12.

The program begins at S100, in which the piston position of the engine 12 at the last time the engine was stopped is read out from the nonvolatile memory 28c1, and proceeds to S102, in which it is determined whether the detected piston position is before the TDC, more precisely, at a position between the after BDC and the before TDC (BTDC).

When the result in S102 is negative, the program proceeds to S104, in which an initial current value for driving the starter-generator, i.e., an initial current value to be supplied to the output winding 18c through the starter-generator driver 28d is set at normal. When the result is affirmative, the program proceeds to S106, in which the initial current value to be supplied to the output winding 18c is increased by a predetermined increment. The initial current value is set as an ON time (duty factor [%]) of the PWM control shown in FIG. 4.

FIG. 12A is an explanatory view for showing the normal set values, and FIG. 12B for the predetermined increments.

This will be explained. In a case where the output winding 18c is used as a motor to start the engine 12, when the piston of the engine 12 is at a position before the TDC (compression top dead center), since it requires relatively a large driving torque to pass through the TDC, it may be difficult to start the engine 12.

In this embodiment, it is therefore configured to determine whether the piston position is at a position before the TDC based on the piston position at the last time the engine 12 was stopped, and when the result is negative, the current value to be supplied to the winding 18c is set at normal. As shown in FIG. 12A, the normal value is originally set at 30[%] and is increased up to 70[%] as increasing engine speed NE.

When the result is affirmative, the current value is increased by the predetermined increment. Specifically, it is increased as the crank angle is away from the TDC, for instance, when the detected crank angle is at 90 degree (i.e., between around the BTDC 1 degree and BTDC 90 degree), the increment is set at 5[%] and when the crank angle is at 180 degree (i.e., between around the BTDC 89 degree and BDC), the increment is set at 15[%]. In S106, the increment (predetermined increment) is added to the normal set value.

The program next proceeds to S108, in which power supply to the output winding 18c is started by the determined set value, and to S110, in which it is determined whether the piston of the engine 12 has passed through the TDC based on the output signal from the pulsar 16c. When the result in S110 is negative, the program returns to S108, while when the result is affirmative, the program proceeds to S112, in which the output winding 18c is driven at the normal set value, i.e., increase of the set value is terminated.

As stated above, in this embodiment, it is configured to have a start control apparatus for an engine generator (10) adapted to generate power based on an output from a winding (output winding) (18) wound around an alternator (alternator section) 16 driven by an engine (12), comprises a battery (14), a booster (DC/DC converter) 28d1 to boost an output of the battery, an engine starter (CPU 28c) adapted to supply the boosted battery output to the winding as a motor current to start the engine, a piston position determiner (CPU 28c. S102) adapted to determine whether a position of a piston of the engine (12) is before a top dead center (TDC) when the boosted output is supplied to the winding, and a motor current determiner (CPU 28c. S106) adapted to increase the motor current by an increment when the piston is determined to be at a position before the top dead center (TDC). With this, since it does not need a starter motor for starting the engine 12, it becomes possible for the structure to be simple. Further, it becomes possible to generate a sufficient torque for the piston to pass through the TDC by increasing the current (specifically, the duty factor of the PWM control) by the increment when the piston of the engine 12 is before the compression top dead center (TDC) and therearound, thereby enabling to start the engine 12 reliably.

To be specific, if the embodiment is configured to simply increase the current, it consumes the energy stored in the battery 14 wastefully and/or causes out of control so that it may be difficult to start the engine 12. However, since it is configured as described above, it becomes possible to minimize the consumption of the energy stored in the battery 14.

Further, as shown in FIG. 12B, since the motor current determiner increases the increment as the position of the piston is away from the top dead center (TDC) when the piston is at a position between after a bottom dead center (BTDC) and the top dead center (TDC), in addition to the above effects, it becomes possible to further decrease the consumption of the energy stored in the battery 14.

Further, since the piston position determiner (CPU 28c, S12, S14) includes a memory (nonvolatile memory) 28c1 that memorizes the position of the piston when the engine was stopped, and the motor current determiner determines whether the position of the piston is before the top dead center based on the memorized piston position, it becomes possible to accurately determine whether the piston position is before the TDC with a simple structure.

Further, it is configured so that the engine generator (10) having the winding (18) composed of first, second and third windings (18a, 18b, 18c) wound around the alternator (16) driven by the engine (12), comprises first, second and third inverters (22a, 22b, 22c) each connected to the first, second and third windings respectively and having switching elements for direct current and alternating current conversion so that when the switching elements for direct conversion are turned ON/OFF, alternating current outputted from the first, second and third windings are converted into direct current, and when the switching elements for alternating conversion are turned ON/OFF based on a PWM signal generated in accordance with a reference sine wave of a desired output voltage waveform and carrier, the converted direct current is inverted into alternating current in a desired frequency, first, second and third controllers (CPUs 22a2, 22b2, 22c2) adapted to control turning ON/OFF of the switching elements for direct current conversion and alternating current inversion of the corresponding first, second and third inverters and connected each other to be able to communicate therewith, the first controller operating the first inverter as a master inverter and the second and third controllers operating the second and third inverters as slave inverters, a three-phase output terminal (26e) connected to terminal groups (26a, 26b, 26c) which are connected to the first, second and third inverters to output the inverted alternating current as one of a U-phase or W-phase and W-phase outputs and connected to a neutral terminal of the terminal groups in series, a single-phase output terminal (26f) connected to the terminal groups in parallel and connected to the neutral terminal in series, a switching mechanism (26g) adapted to switch the three-phase output terminal and single-phase output terminal, and a three-phase/single-phase selector switch (30e) adapted to be manipulated by a user; wherein the first, second and third controllers control turning ON/OFF of the switching elements so that the outputs from the first, second and third inverters becomes three-phase alternating current or single-phase alternating current making the output from the first inverter as a reference in response to the output of the selector switch which is sent from the engine controller.

With this, in addition to the above effects, it becomes possible to output the three-phase AC and single-phase AC at the desired voltage selectively and reliably in response to the output of the selector switch 30e that is adapted to be manipulated by the user.

It should be noted that in the foregoing, although an inverter generator is described as an engine generator, the embodiment can be applied for any types of generators which generates power based on output from a winding wound around an alternator that is driven by an engine.

Japanese Patent Application No. 2011-110575 filed on May 17, 2011, is incorporated by reference herein in its entirety.

While the invention has thus been shown and described with reference to a specific embodiment, it should be noted that the invention is in no way limited to the details of the described arrangements; changes and modifications may be made without departing from the scope of the appended claims.

What is claimed is:

1. A start control apparatus for an engine generator adapted to generate power based on an output from a winding wound around an alternator driven by an engine and to have a battery, a booster to boost an output of the battery and an engine starter to supply the boosted battery output to the winding as a motor current to start the engine, comprising:
   a piston position determiner adapted to determine whether a position of a piston of the engine is before a top dead center when the boosted output is supplied to the winding; and
   a motor current increaser adapted to increase the motor current by an increment when the piston is determined to be at a position before the top dead center.

2. The apparatus according to claim 1, wherein the motor current determiner increases the increment as the position of the piston is away from the top dead center when the piston is at a position between after a bottom dead center and the top dead center.

3. The apparatus according to claim 1, wherein the piston position determiner includes a memory that memorizes the position of the piston when the engine was stopped; and
   the motor current determiner determines whether the position of the piston is before the top dead center based on the memorized piston position.

4. The apparatus according to claim 2, wherein the piston position determiner includes a memory that memorizes the position of the piston when the engine was stopped; and
   the motor current determiner determines whether the position of the piston is before the top dead center based on the memorized piston position.

5. The apparatus according to claim 1, the engine generator having the winding composed of first, second and third windings wound around the alternator driven by the engine, comprising:
   first, second and third inverters each connected to the first, second and third windings respectively and having switching elements for direct current and alternating current conversion so that when the switching elements for direct conversion are turned ON/OFF, alternating current outputted from the first, second and third windings are converted into direct current, and when the switching elements for alternating conversion are turned ON/OFF based on a PWM signal generated in accordance with a reference sine wave of a desired output voltage waveform and carrier, the converted direct current is inverted into alternating current in a desired frequency;

first, second and third controllers adapted to control turning ON/OFF of the switching elements for direct current conversion and alternating current inversion of the corresponding first, second and third inverters and connected each other to be able to communicate therewith, the first controller operating the first inverter as a master inverter and the second and third controllers operating the second and third inverters as slave inverters;

a three-phase output terminal connected to terminal groups which are connected to the first, second and third inverters to output the inverted alternating current as one of a U-phase or W-phase and W-phase outputs and connected to a neutral terminal of the terminal groups in series;

a single-phase output terminal connected to the terminal groups in parallel and connected to the neutral terminal in series;

a switching mechanism adapted to switch the three-phase output terminal and single-phase output terminal; and a three-phase/single-phase selector switch adapted to be manipulated by a user;

wherein the first, second and third controllers control turning ON/OFF of the switching elements so that the outputs from the first, second and third inverters become three-phase alternating current or single-phase alternating current making the output from the first inverter as a reference in response to the output of the selector switch which is sent from the engine controller.

6. A method for controlling start of an engine generator adapted to generate power based on output from a winding wound around an alternator driven by an engine, and having a battery, a booster to boost an output of the battery and an engine starter adapted to supply the boosted battery output to the winding as a motor current, comprising the steps of:

determining whether a position of the piston is before a top dead center when the boosted output is supplied to the winding; and increasing the motor current by an increment when the position of the piston is determined to be at a position before the top dead center.

7. The method according to claim 6, wherein the step of increasing increases the increment as the position of the piston is away from the top dead center when the piston is at a position between after a bottom dead center and the top dead center.

8. The method according to claim 6, the engine generator including a memory; the method further comprising the step of:

memorizing the position of the piston when the engine was stopped, wherein the step of determining determines whether the position of the piston is before the top dead center based on the memorized piston position.

9. The method according to claim 7, the engine generator including a memory; the method further comprising the step of:

memorizing the position of the piston when the engine was stopped, wherein the step of determining determines whether the position of the piston is before the top dead center based on the memorized piston position.

* * * * *